Patented Nov. 24, 1942

2,302,679

UNITED STATES PATENT OFFICE 2,302,679

PROCESS OF TREATING WOOL GREASES

Isaac J. Drekter, Woodside, and Lester I. Conrad, Brooklyn, N. Y., assignors to American Cholesterol Products, Inc.

No Drawing. Application September 12, 1939, Serial No. 294,444

10 Claims. (Cl. 260—397.2)

This invention relates to process of treating wool greases; and it consists essentially in saponifying these materials, which tend to be decomposed by caustic alkalis, by treatment with barium hydroxide for the purpose of isolating cholesterols, sterols, and other constituents.

Broadly our process comprises treating wool grease with barium hydroxide in aqueous media in order to saponify the same, removing all water soluble substances and then separating the saponified material from the unsaponified material and further treating either or both of said materials in order to obtain the final product desired. In some cases the barium soaps may be desired since they are useful in the production of grease, lubricating materials and for other uses. On the other hand, the barium soaps may be treated so as to produce the free fatty acids, which have commercial value in many different fields such as in the production of household soaps, etc.

The unsaponified materials, recovered in our process, contain valuable constituents, such as cholesterol, iso-cholesterol, vitamins, ceryl alcohol and hydrocarbons, and these may be obtained in varying degrees of purity according to the present process.

Another product obtainable by the present invention is a substance containing all of the original constituents of the starting material with the exception that the saponifiable esters are hydrolyzed into their corresponding fatty acids and alcohols. Such a product is of commercial value in the cosmetic industry.

Heretofore, when it has been desired to saponify wool grease, it has been deemed necessary to use caustic soda or potash, preferably in alcoholic solution or dissolved in other solvents. Such strong caustic solutions tend to decompose either wholly or in part certain constituents of the wool grease by polymerization, degradation or even rearrangement of the atoms within the molecule. This is particularly true of materials which are unstable and which therefore readily decomposed, such as the vitamins, hormones, sterols etc. By means of the present invention destruction of the unstable materials has been substantially eliminated with the result that the yields obtained are higher. Also according to the present invention the number of process steps is reduced as compared with prior processes, resulting in a saving of labor and time. In addition the individual steps of our process are less complicated and more practical, particularly the steps involving separations and extractions, since no liquid-liquid extractions are required.

As compared with prior art processes which involve the use of caustic alcoholic solutions and result in the production of emulsions, the present process employs aqueous solutions. This results in the important advantage that certain impurities may be easily removed by washing with water since emulsions are not formed.

It has also been found that, whereas alcoholic solutions of caustic soda and potash only partially saponify wool grease, barium hydroxide in aqueous solution substantially completely saponifies the saponifiable matter present. In view of the complete saponification in an aqueous medium, the use of an alcoholic solution is not only unnecessary but also undesirable because of increased costs and more difficult operation.

The unsaponifiable material obtained by our process is so free of decomposed, rearranged and polymerized products, that it is possible by a simple separation, using ordinary solvents to isolate and crystalize the constituents in higher yields, purer state and with greater ease than from unsaponifiable fractions obtained from wool grease by other processes. The cholesterol and iso-cholesterol obtained by our process by simple crystallization likewise is free of any objectionable color, odor, degraded, polymerized or rearranged products which would make these materials unsuitable for pharmaceutical and cosmetic use.

According to the present invention the wool grease is treated with an aqueous solution of barium hydroxide, these materials being mixed until the reaction is complete. Water is then added and the barium soaps, together with all water-insoluble unsaponified matter separate in finely divided form. The insoluble matter is filtered off and washed with water to remove excess barium hydroxide and other water soluble substances, such as glycerin, coloring matter and odoriferous materials. The washed material is then dried. If it is desired to separate the barium soaps from the water insoluble unsaponified matter, one may perform an extraction with such solvents as acetone, ethyl-methyl ketone, ethyl alcohol, methyl alcohol, etc. or mixtures thereof, in which the barium soaps are insoluble and in which the unsaponified matter is soluble. The barium soaps may be filtered off or otherwise separated from the solution. The resulting acetone solution recovered from the extraction step may be further treated as hereinafter described. The barium soaps recovered after the described extraction step are in a relatively pure state and may be utilized in the grease-making or the soap industry if desired. For example, the barium soaps may be hydrolyzed with sulfuric acid, resulting in the precipitation of barium sulfate and the recovery of free fatty acids, the latter being converted into soaps by conventional methods or being used for other purposes. The barium compounds, i. e. the barium hydroxide obtained from the washings following the saponification step and the barium salts recovered by hydrolysis, may be treated by concentration and/or precipitation to recover the barium.

The acetone solution recovered from the extraction step and containing the unsaponified material, contains valuable constituents, such as cholesterol, iso-cholesterol, ceryl alcohol and hydrocarbons. The acetone may be distilled off in the usual manner in order to obtain a relatively pure product. In this connection it has been found that the proportion of valuable constituents, such as cholesterol, in the product may be varied by varying the conditions of the acetone extraction. For instance, if the acetone extraction is carried out at 20° C., the cholesterol content of the final product will be 23 percent higher than if the extraction should be carried out at 60° C. The cholesterol content also varies with the solvent used in the extraction step.

If desired, the washed material, recovered from the saponification step and consisting of saponified and unsaponified matter, may be treated in such manner that the barium soaps contained therein are hydrolyzed into their corresponding fatty acids. This treatment involves the use of hydrochloric acid to form barium chloride, which is removed by washing. The product obtained in this manner contains all the original constituents of the starting material with the exception that the original ester content is hydrolyzed into the corresponding fatty acids and alcohols. As an alternative procedure, sulfuric acid may be used, forming insoluble barium sulfate, the remaining material being dissolved and removed by extraction with a solvent, such as ether. The product obtained by this procedure contains the unsaponified matter and free fatty acids and is useful in the cosmetic industry.

The insoluble material recovered after saponification, washing and drying may be dissolved in a solvent such as carbon tetrachloride, chloroform, ether, petroleum products, etc., in which the entire mass is soluble and thereafter another solvent, such as acetone, methyl alcohol etc., may be added to precipitate the barium soaps, leaving the unsaponified material in solution.

The method used for fractionating the unsaponifiable material into constituent products is dependent on the solvent used in separating the unsaponifiable matter from the soaps. In the case of an acetone extraction, the unsaponifiable matter in the acetone solution is cooled, causing the precipitation of the iso-cholesterol which is then filtered off. The acetone is then distilled off and the residue treated with hot methyl alcohol. The insoluble material consisting of an oil is separated. On cooling cholesterol and other substances precipitate out of the methyl alcohol. In practice we have found that, by first distilling off the methyl alcohol and then dissolving the material in ethyl alcohol and cooling, better yields of pure cholesterol are obtained. The material remaining after the removal of cholesterol is then freed of alcohol and is useful in the cosmetic and other industries.

Where solvents other than acetone are used to separate the unsaponifiable matter from the soaps, modifications of the above procedure are introduced to fractionate the unsaponifiable matter into its component parts. For instance, where methyl alcohol is used in the above instance, the unsaponifiable matter is treated with acetone to remove the iso-cholesterol and then with ethyl alcohol to crystallize the cholesterol.

The examples which follow will serve to more clearly define the invention.

EXAMPLE 1

10 parts of wool wax or wool grease, are first heated to about 87.5° C. in a container which may be heated indirectly. Then a solution of 7.5 parts barium hydroxide, $Ba(OH)_2 \cdot 8H_2O$, in 5 parts of water at 100° C. is added to the melted wax and the whole is mixed for about one-half hour while the temperature is maintained at about 87° C. If desired the materials may be mixed together at the specified temperatures and stirred until cool. Also it may be desirable to add a small amount, about 1/50 part of an antioxidant, such as hydroquinone, to the mixture. The saponification step may be carried out in the air, under a vacuum, or in an atmosphere of an inert gas such as nitrogen.

After the saponification has been completed about 10 parts of water are added and the mixing continued until the solids in the container have been broken up into small, fine particles. These particles are then separated from the liquid, washed with water until free from odor, color and barium, the latter being detected by the sulfate test. The particles are then dried in a current of warm air and treated with acetone at 60° C. The barium soaps, which are not dissolved are then separated from the acetone solution in which the unsaponified material is dissolved, by filtering or other means. The acetone is then distilled off leaving the unsaponifiable fraction of the original wax. The yield is about 53 per cent and the product contains about 30 per cent of free cholesterol. The separated barium soaps may be freed from acetone by distillation or mere exposure to air. In the above example, if the saponification is carried out at 50° C., the yield will be 67 per cent with a free cholesterol content of 14 per cent, or if carried out at 100° C., the yield will be 49 per cent and the free cholesterol content 25 per cent.

It has been found that, if the dried particles recovered after the saponification are treated with acetone at 20° C. instead of 60° C., the final yield will be only about 35 per cent while the free cholesterol content is 37 per cent.

The following table gives the respective yields and cholesterol contents when solvents other than acetone are used.

| Solvent | Temperature | Yield | Free cholesterol content |
|---|---|---|---|
| | | Per cent | Per cent |
| Methyl alcohol | 20° C | 25 | 40 |
| Do | 64° C (boiling point) | 56 | 28 |
| Ethyl alcohol | 20° C | 28 | 38 |
| Do | 78° C (boiling point) | 65 | 25 |
| Ethyl methyl ketone | Boiling | 60 | 28 |
| Acetone and methyl alcohol (equal parts) | ---do--- | 52 | 28 |

If desired the dried particles recovered after saponification may be dissolved in 15 parts of carbon tetrachloride, after which 20 parts of acetone may be added to precipitate the barium soaps. The latter may be filtered off and the filtrate distilled to recover unsaponified matter. Under these circumstances the yield obtained is 63 per cent and the free cholesterol content of the product is 25 per cent.

Instead of using the solvent extraction method the barium soaps may be separated from the unsaponified material by distilling off the latter without drying in a high vacuum still. By this method the yield obtained is about 40 per cent and the free cholesterol content 30 per cent. If steam distillation is used, the desired product may be extracted from the steam distillate, the yield being 52 per cent and the free cholesterol content 20 per cent.

If, in the above example, the concentration of the barium hydroxide is decreased by using 5 parts barium hydroxide to 10 parts of water, that is, if the barium hydroxide concentration is reduced to 20 per cent $Ba(OH)_2 \cdot 8H_2O$ based on the mixture, the yield will be 50 per cent, the product obtained containing only 18 per cent free cholesterol. These results show that, in order to obtain maximum yields, the concentration of barium hydroxide employed in our process should not be substantially below 20 per cent based on the weight of the equivalents of $Ba(OH)_2 \cdot 8H_2O$ in the mixture, the saponification mixture being advantageously heated to a temperature not substantially exceeding 100° C.

As another alternative procedure the washed particles recovered from the saponification step may be treated with a 10 per cent aqueous solution of hydrochloric acid, which is stirred well into the mixture. The resulting barium chloride salt is then removed by washing and the insoluble product dried in warm air. The dried product, if subsequently treated as indicated in the example, will give a yield of 98 per cent, the product containing 16.5 per cent free cholesterol.

If the barium soaps are separated in a relatively pure state, as described above, these soaps may be treated with a 20 per cent aqueous solution of hydrochloric acid, and the resulting barium chloride washed out, leaving the fatty acids which may then be dried and recovered.

As a further modification of the above described procedures it is possible to bubble $CO_2$ gas through the mixture of materials immediately following the saponification step in order to precipitate the excess barium as barium carbonate. After this step the material is treated as indicated above, the barium carbonate being separated together with the barium soaps. The barium compounds may then be treated so as to recover the barium, for instance, by ignition of the barium containing materials.

EXAMPLE 2

*Isolation of iso-cholesterol.*—The wool grease is saponified according to Example 1. The unsaponifiable matter is extracted with hot acetone using 5 parts of solvent to 1 part of unsaponifiable matter. The acetone solution is then chilled to about 10° C. resulting in the formation of a precipitate of iso-cholesterol which is then filtered off and washed. Yield—6 pounds of iso-cholesterol from 100 pounds of wool grease.

EXAMPLE 3

*Isolation of cholesterol.*—The filtrate from Example 2, after removal of the iso-cholesterol, is evaporated to dryness and extracted with hot methyl alcohol using 6 parts of solvent to 1 part of unsaponifiable matter. The methyl alcohol soluble materials are dried by distillation and dissolved in hot 95 per cent ethyl alcohol. Upon cooling, cholesterol crystallizes out of solution and is filtered off and washed. Yield—12 to 15 pounds of cholesterol from 100 pounds of wool grease. After removal of the cholesterol, the alcoholic solution is evaporated to dryness. The residue, which contains a small amount of cholesterol, ceryl alcohol and certain hydrocarbons, is useful in the pharmaceutical, cosmetic, leather and other industries. Yield of residue—25 pounds from 100 pounds of wool grease. The ceryl alcohol is isolated from the residue by crystallization from methyl alcohol or petroleum ether. Yield—8 pounds from 100 pounds of wool grease.

In the preceding discussion, where we have referred to the use of percentages or parts of barium hydroxide without designating the formula thereof, reference has been made to the common commercial form of this material, namely the 8-hydrate, $Ba(OH)_2 \cdot 8H_2O$. It is obvious, of course, that equivalent quantities of anhydrous barium hydroxide or of barium oxide, which dissolves in the form of the hydroxide, may be substituted for the barium hydroxide used in the specific examples.

By the use of the word "wool grease" we include wool waxes and wool fats.

Applicants have filed a divisional application Serial No. 460,112, filed September 29, 1942, for matter not claimed herein.

The foregoing description is not to be interpreted as a limitation of the essential features and characteristics of the present invention which must be construed by the scope of the appended claims.

What we claim is:

1. A process for the treatment of wool grease comprising the steps of saponifying such a material by treatment with barium hydroxide in aqueous media and extracting the water insoluble residue with an organic solvent to separate the unsaponified matter including the sterols from the resulting soaps the temperature employed during said treatment not substantially exceeding 100° C. whereby the destruction of the desired sterols is prevented.

2. The process of claim 1 wherein the water insoluble residue is treated with a solvent in which the entire mass is soluble, to which is then added a solvent in which the barium soaps are insoluble, thereby producing a separation of the barium soaps from the unsaponifiable matter including the sterols.

3. The process of claim 1 wherein the water insoluble reaction products are subjected to steam distillation to separate the unsaponifiable matter which is recovered from the distillate.

4. The process of claim 1 wherein the water insoluble residue is subjected to vacuum distillation and the unsaponifiable matter is recovered in the distillate.

5. The process of claim 1 including the further step of treating the insoluble residues, after removal of the unsaponified matter, with an acid to produce hydrolysis of the soaps present, and recovering the liberated fatty acids.

6. A process for the isolation of iso-cholesterol from wool grease, comprising the steps of saponifying wool grease with barium hydroxide in an aqueous medium at a temperature not substantially exceeding 100° C., thereby preventing destruction of the iso-cholesterol present, washing the resulting product with water, drying the residue, and extracting with a hot solvent from which iso-cholesterol precipitates upon cooling.

7. A process for the recovering of free cholesterol from wool grease comprising the steps of saponifying wool grease with barium hydroxide in an aqueous medium, washing and drying the resulting water insoluble residue, removing iso-cholesterol and all methyl alcohol insoluble materials, extracting with ethyl alcohol and crystallizing free cholesterol from the ethyl alcohol solution.

8. The process which comprises treating wool grease with an aqueous solution of barium hydroxide separating the water insoluble reaction products from the aqueous liquor, treating said reaction products with an acid under conditions producing hydrolysis of the barium soaps present and precipitation of an insoluble barium salt, and separating said salt from the resulting fatty acids, and unsaponifiable material by extraction with ether.

9. The process which comprises treating wool grease with barium hydroxide in aqueous medium, the concentration of the barium hydroxide being not substantially below 20% based on the weight of the mixture and the temperature being not substantially above 100° C., treating the resulting aqueous liquor with carbon dioxide to precipitate excess barium hydroxide, separating the water insoluble reaction products from the aqueous liquor and removing unsaponified matter from said reaction products by extraction.

10. A process for the production of wool grease concentrates containing free cholesterol and other alcoholic constituents only which comprises the step of saponifying wool grease with an aqueous medium containing not substantially less than about 20 per cent of barium hydroxide based on the weight of the equivalents of $Ba(OH)_2 \cdot 8H_2O$ in the mixture and at a temperature not substantially exceeding 100° C.

ISAAC J. DREKTER.
LESTER I. CONRAD.